(12) United States Patent
Wickman

(10) Patent No.: US 9,053,444 B2
(45) Date of Patent: Jun. 9, 2015

(54) DEPLOYING APPLICATIONS IN A SMART THIN CLIENT SERVER

(75) Inventor: Glenn Ward Wickman, San Jose, CA (US)

(73) Assignee: MobileFrame, LLC, Los Gatos, CA (US)

( * ) Notice: Subject to any disclaimer, the term of this patent is extended or adjusted under 35 U.S.C. 154(b) by 358 days.

(21) Appl. No.: 13/571,275

(22) Filed: Aug. 9, 2012

(65) Prior Publication Data

US 2013/0041980 A1    Feb. 14, 2013

Related U.S. Application Data

(63) Continuation-in-part of application No. 13/470,152, filed on May 11, 2012.

(60) Provisional application No. 61/521,673, filed on Aug. 9, 2011.

(51) Int. Cl.
  *G06F 15/177*  (2006.01)
  *G06Q 10/06*  (2012.01)

(52) U.S. Cl.
  CPC .................................... *G06Q 10/06* (2013.01)

(58) Field of Classification Search
  CPC ............................... H04L 67/34; G06Q 10/06
  USPC .............. 709/203, 217, 219, 220; 707/610; 717/100, 168, 171, 174, 176
  See application file for complete search history.

(56) References Cited

U.S. PATENT DOCUMENTS

| | | | |
|---|---|---|---|
| 5,923,842 A | | 7/1999 | Pedersen et al. |
| 6,332,163 B1 * | | 12/2001 | Bowman-Amuah .......... 709/231 |
| 6,564,261 B1 | | 5/2003 | Gudjonsson et al. |
| 7,035,919 B1 | | 4/2006 | Lee et al. |
| 7,289,964 B1 | | 10/2007 | Bowman-Amuah |
| 7,457,878 B1 | | 11/2008 | Mathiske et al. |
| 7,685,253 B1 | | 3/2010 | Valia |
| 7,788,497 B2 | | 8/2010 | Luo et al. |
| 8,341,270 B2 | | 12/2012 | Mazzaferri et al. |
| 2002/0016777 A1 | | 2/2002 | Seamons et al. |

(Continued)

FOREIGN PATENT DOCUMENTS

| | | |
|---|---|---|
| JP | 2000339245 A | 12/2000 |
| WO | WO-2008059535 A2 | 5/2008 |

(Continued)

OTHER PUBLICATIONS

"U.S. Appl. No. 13/470,152, Examiner Interview Summary mailed Dec, 24, 2013", 3 pgs.

(Continued)

*Primary Examiner* — Frantz Jean

(74) *Attorney, Agent, or Firm* — Schwegman Lundberg & Woessnper, P.A.

(57) ABSTRACT

A method for deploying an enterprise application to enterprise users is provided. First, a defined sequence identifying a series of preverified functions is received, wherein the defined sequence constitutes the enterprise application. Then, the defined sequence is stored in a database, wherein the database additionally includes enterprise data created by use of the enterprise application. The enterprise application is then synchronized to the enterprise users in the same manner that the enterprise data is synchronized to the enterprise users.

18 Claims, 15 Drawing Sheets

(56) References Cited

U.S. PATENT DOCUMENTS

| | | |
|---|---|---|
| 2003/0105884 A1 | 6/2003 | Upton |
| 2003/0126245 A1 | 7/2003 | Feltin et al. |
| 2004/0199922 A1 | 10/2004 | Krutsch et al. |
| 2004/0236860 A1 | 11/2004 | Logston et al. |
| 2004/0240642 A1 | 12/2004 | Crandell et al. |
| 2005/0160155 A1* | 7/2005 | Geekee et al. ............ 709/220 |
| 2005/0256735 A1* | 11/2005 | Bayne .......................... 705/1 |
| 2006/0080468 A1 | 4/2006 | Vadlamani et al. |
| 2006/0230438 A1 | 10/2006 | Shappir et al. |
| 2007/0294414 A1 | 12/2007 | Koshiba |
| 2008/0028206 A1 | 1/2008 | Sicard et al. |
| 2008/0059496 A1 | 3/2008 | Bell et al. |
| 2008/0126534 A1 | 5/2008 | Mueller et al. |
| 2008/0127135 A1 | 5/2008 | Bergstrom et al. |
| 2009/0124376 A1 | 5/2009 | Kelly et al. |
| 2009/0254971 A1 | 10/2009 | Herz et al. |
| 2010/0106826 A1 | 4/2010 | Sugawara |
| 2010/0107227 A1 | 4/2010 | Hicks |
| 2010/0175119 A1 | 7/2010 | Vitaletti |
| 2010/0268831 A1 | 10/2010 | Scott et al. |
| 2010/0281178 A1 | 11/2010 | Sullivan |
| 2011/0035241 A1 | 2/2011 | Camenisch et al. |
| 2011/0078773 A1 | 3/2011 | Bhasin et al. |
| 2011/0307544 A1 | 12/2011 | Lotlikar et al. |
| 2012/0023334 A1 | 1/2012 | Brickell et al. |
| 2012/0246323 A1 | 9/2012 | Gopinath et al. |
| 2013/0041939 A1 | 2/2013 | Wickman |
| 2013/0042312 A1 | 2/2013 | Wickman |
| 2014/0280771 A1* | 9/2014 | Bosworth et al. ............ 709/219 |

FOREIGN PATENT DOCUMENTS

| | | |
|---|---|---|
| WO | WO-2013023095 A2 | 2/2013 |
| WO | WO-2013023095 A3 | 5/2013 |

OTHER PUBLICATIONS

"U.S. Appl. No. 13/470,152, Final Office Action mailed Apr. 9, 2014", 34 pgs.

"U.S. Appl. No. 13/470,152, Non Final Office Action mailed Aug. 30, 2013", 26 pgs.

"U.S. Appl. No. 13/470,152, Response filed Jul. 1, 2013 to Restriction Requirement mailed May 31, 2013", 7 pgs.

"U.S. Appl. No. 13/470,152, Response filed Dec. 30, 2013 to Non Final Office Action mailed Aug. 30, 2013", 11 pgs.

"U.S. Appl. No. 13/470,152, Restriction Requirement mailed May 31, 2013", 6 pgs.

"International Application Serial No. PCT/US2012/050200, International Preliminary Report on Patentability mailed Feb. 20, 2014", 8 pgs.

"International Application Serial No. PCT/US2012/050200, International Search Report mailed Feb. 28, 2013", 4 pgs.

"International Application Serial No. PCT/US2012/050200, Written Opinion mailed Feb. 28. 2013", 6 pgs.

"U.S. Appl. No. 13/470,152, Examiner Interview Summary mailed Jun. 2, 2014", 3 pgs.

"U.S. Appl. No. 13/470,152, Non Final Office Action mailed Oct. 27, 2014", 22 pgs.

"U.S. Appl. No. 13/571,269, Non Final Office Action mailed Oct. 30, 2014", 10 pgs.

Miles, "Implementing Windows Terminal Server and Citrix MetaFrame on IBM e server xSeries Servers", International Business Machines, (Apr. 2003), 62 pgs.

* cited by examiner

FIG. 9

DEPLOYING APPLICATIONS IN A SMART THIN CLIENT SERVER

CROSS REFERENCE TO RELATED APPLICATIONS

This application is a continuation-in-part of U.S. patent application Ser. No. 13/470,152, filed on May 11, 2012, which claimed the benefit of priority under 35 U.S.C. §119(e) to U.S. Provisional Patent Application No. 61/521,673, filed on Aug. 9, 2011, both of which are incorporated herein by reference in its entirety for all purposes.

BACKGROUND

1. Technical Field

The present disclosure relates generally to enterprise solutions. More specifically, the present disclosure relates to deploying applications to a thin client server website.

2. Description of the Related Art

Every business requires the completion and monitoring of various business processes. Commonly, many of these processes are performed using paper-based solutions, generally involving the completion and tracking of paper forms within an organization. The rise of mobile computing devices, however, has led to an increase in enterprise mobility solutions, where paper-based processes are replaced with wireless applications that are much more efficient. These enterprise mobility solutions, however, require custom programming.

One solution to this is to create a system where novice computer users are able to instantly create, manage, and deploy sophisticated mobile applications without the need for custom programming. All programming and synchronization complexities can be handled in the background, making them transparent to the business user.

One problem, however, with such a solution is determining how such sophisticated mobile applications will be deployed to the enterprise users. In the traditional software model, applications are compiled into executable files. Enterprise users then can execute these executable files on their own devices, and since the applications have been fully compiled, they are able to be run directly by the operating system. One issue with this design, however, is that it requires the application designer to compile and distribute the executable files to the various users. This can be quite difficult to manage, especially in large enterprises or when an application designer is deploying many different applications.

BRIEF DESCRIPTION OF THE DRAWINGS

FIG. 9 is a diagram illustrating a screen capture of adding options in accordance with an example embodiment.

DETAILED DESCRIPTION OF SPECIFIC EMBODIMENTS

Reference will now be made in detail to specific embodiments of the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims. In the following description, specific details are set forth in order to provide a thorough understanding of the present disclosure. The present disclosure may be practiced without some or all of these specific details. In addition, well known features may not have been described in detail to avoid unnecessarily obscuring the disclosure.

In accordance with an example embodiment, the components, process steps, and/or data structures may be implemented using various types of operating systems, programming languages, computing platforms, computer programs, and/or general purpose machines. In addition, those of ordinary skill, in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present disclosure may also be tangibly embodied as a set of computer instructions stored on a computer readable medium, such as a memory device.

In an example embodiment, a smart thin client server can be deployed to create, manage, and deploy enterprise applications that includes several different novel method of authentication to address these problems. In an example embodiment, a session maintenance system for a smart thin client server is provided. In this embodiment, users are provided with a smart thin client, requiring very few resources or alterations on the client side. The smart thin client allows users to access hosted applications via standard browsers. Furthermore, the smart thin client does not require the storage of data on the client side, making it easier to deploy in an enterprise, where some devices may not have available storage, and where security issues may prevent the storage of additional data on a client device.

Figure 1:
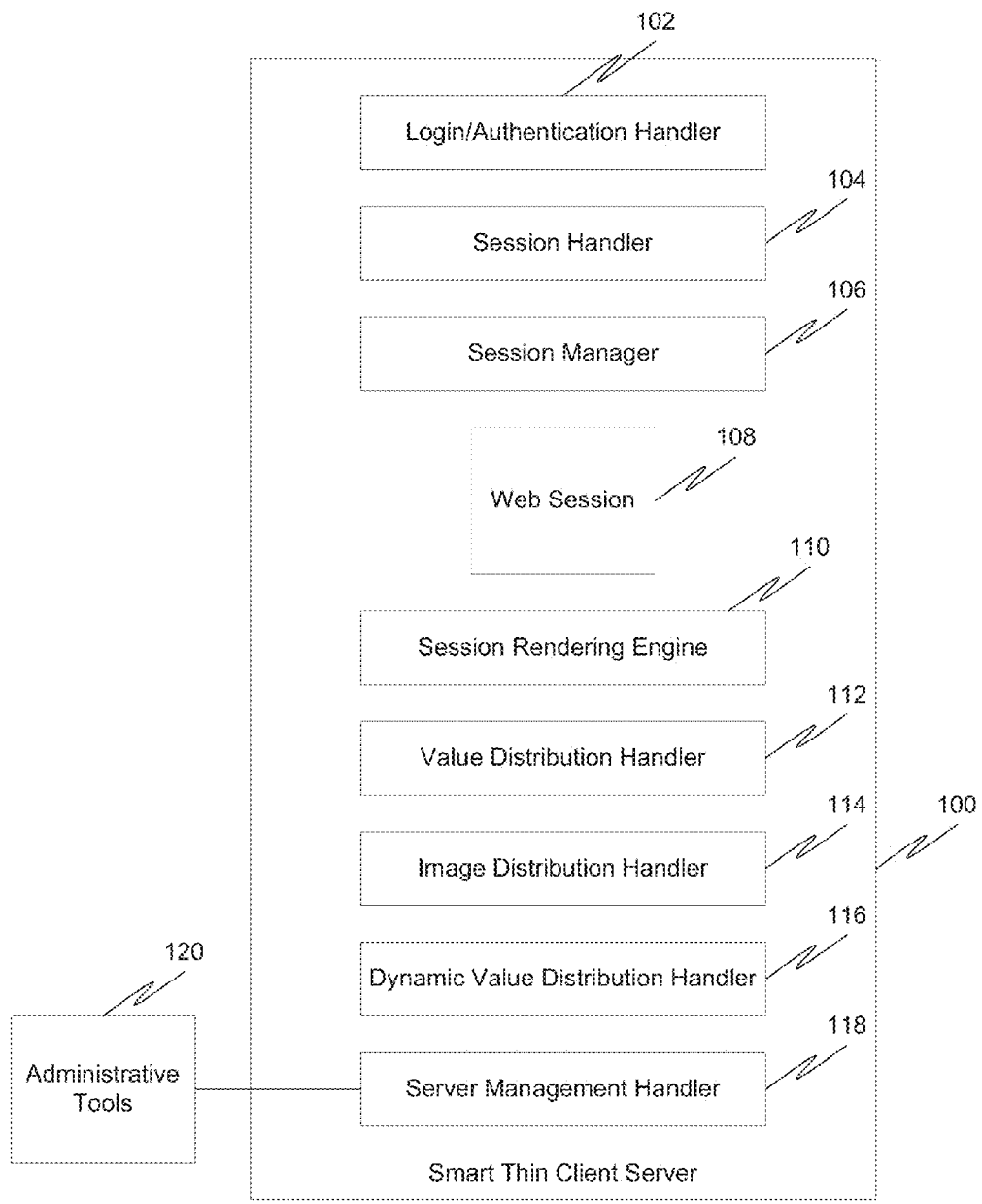
FIG. 1 is a block diagram illustrating a smart thin client server architecture in accordance with an example embodiment.

FIG. 1 is a block diagram illustrating a smart thin client server architecture in accordance with an example embodiment. As will be seen in this diagram, most of the processing elements are located on the smart thin client server, freeing up resources on the device containing a smart, thin client. The smart thin client server 100 may contain a login/authentication handler 102. This component generates a login page and authenticates a user along with a session manager (described later) or forwards the user to an alternate server for servicing (also described later). The smart thin client server 100 may also contain a session handler 104. This component responds to browser requests for or post backs from a rendered session. This component also confirms session validity, processes input, and returns a current session state as HTML.

Figure 2:
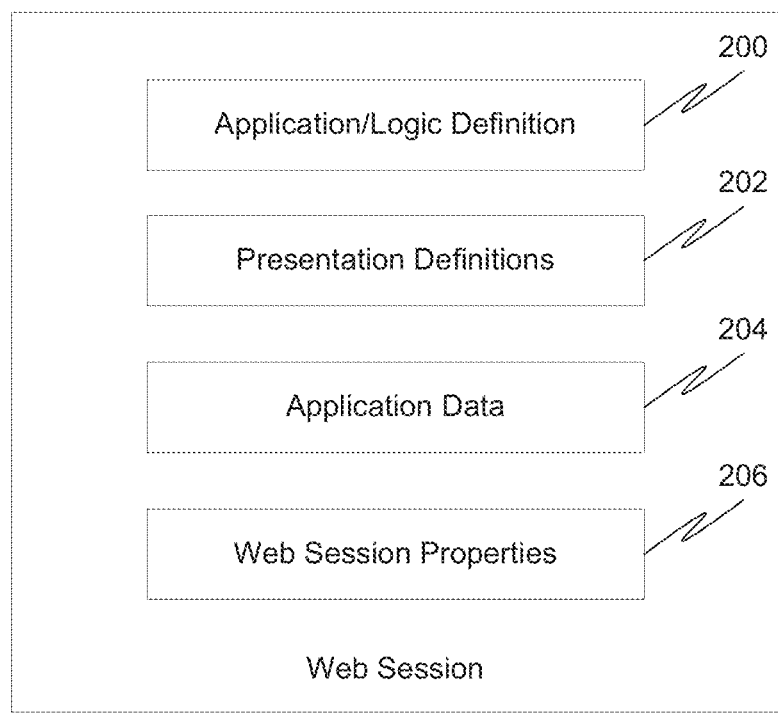
FIG. 2 is a diagram illustrating a web session 108 in more detail in accordance with an example embodiment.

The smart thin client server 100 may also contain a session manager 106. This component creates new sessions or restores existing sessions. Generally it is responsible for cleanup and management of idle sessions. The smart thin client server 100 may also contain a web session 108. The web session 108 is a data structure that retains all application data, user interface designs, and session-specific data. FIG. 2 is a diagram illustrating a web session 108 in more detail in accordance with an example embodiment. An application/logic definition 200 contains all fields of data, data types, and options of the values allowed. It contains all workflow (logic) flow on any events within those fields of data (changing a value for example). It also contains any global application properties as well as properties specific to individual fields.

Presentation definitions 202 contain all visual elements associated with the application presentation (user interface) for a particular device and language. Elements may or may not correspond to a field of data in the application.

Application data 204 contains all values and dynamically adjustable properties for every field of data for every instance of any application running within the user's session.

Web session properties 206 contain properties specific to a particular active web session. Examples include session/transaction tokens, database connections, browser information, last access time, etc.

Referring back to FIG. 1, the smart thin client server 100 also may contain a session rendering engine 110. This component generates and optionally optimizes the HTML that corresponds to the current page in a web session.

The smart thin client server 100 may also contain a value distribution handler 112. This component returns values from browser requests, including but not limited to rich data type values like files.

The smart thin client server 100 may also contain an image distribution handler 114. This component returns optimized images from browser requests. Images may be data in the user's session or part of the defined user interface.

The smart thin client server 100 may also contain a dynamic value distribution handler 116. This component returns partial HTML from browser requests supporting dynamic or on-demand pulling of data values.

The smart thin client server 100 may also contain a server management handler 118. This component provides a request point for managing a server via administrative tools 120. Examples include the ability to query/manage the server (i.e., start, stop, restart) and query/manage web sessions.

Figure 3:
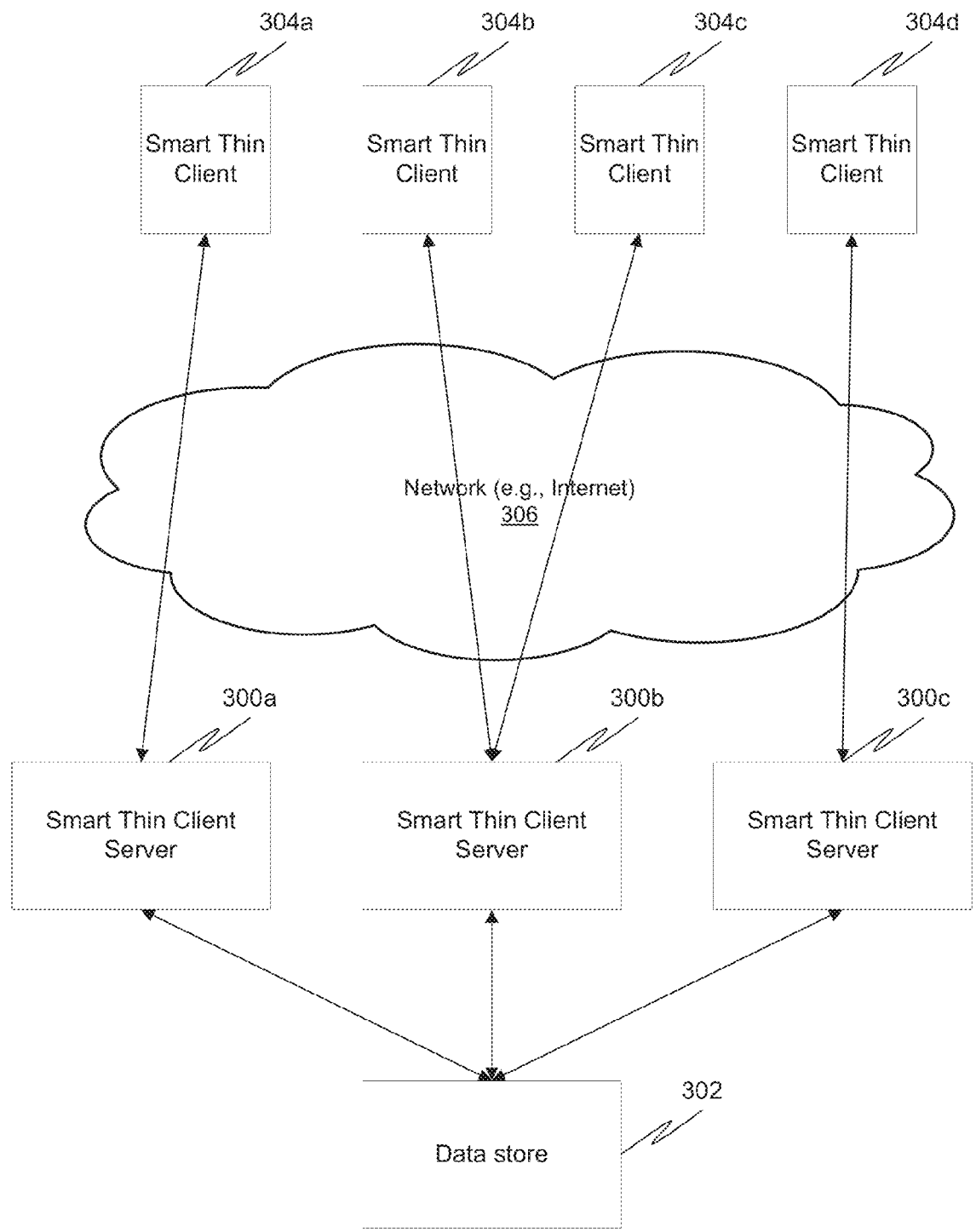
FIG. 3 is a block diagram illustrating a system with multiple smart thin client servers

A single system may have multiple smart thin client servers, in order to better balance the computing load in the system. FIG. 3 is a block diagram illustrating a system with multiple smart thin client servers. Smart thin client servers 300a, 300b, 300c all may connect to a single data store 302, such as a database. This system allows for separate web-sites for each smart thin client server, scalability/web farming, or other segregation of users and/or functionality. Also depicted are multiple smart thin clients 304a, 304b, 304c, 304c connected to various smart thin client servers 300a, 300b, 300c through computer network 306.

In another example embodiment, applications designed on the smart thin client server are automatically deployed to enterprise users without the need for compilation (or at least, full compilation, depending upon one's definition of compiling). There is no executable and there is no need to think about distribution. The application is created with an application creation tool, and that information gets stored inside the database. At that point, there is a separate facility that determines who gets what and when they get it. This separate facility also can base this on information about what recipients are allowed to get. Part of what is being distributed is the backend data from the enterprise, but it is also the application itself. The administrator can indicate that he wishes for particular users, or entire groups, or the entire enterprise, or any combination thereof to receive a certain application, and the separate facility then distributes the application as if it were simply data being synchronized.

When the application then runs "on" the smart thin client, no executable is being executed. Instead, the smart thin client server runs the application in its own context.

By having the applications exist inside the database as data, rather than as executable files, it allows the same synchronization facility that handles the synchronization of data to the various smart thin clients to also handle the deployment of the applications) itself. The thin client server is told which users are permitted to access the application, and then when those users log in, the thin client server permits access to the application. Thus, in a sense, there is not actually any deployment of the application to the client itself.

The application actually runs in the session provided by the operating environment. In the case of the thin client, the session is virtual and exists on the thin client server. In the case of a thick client, the session is still virtual, it just exists on the thick client.

Not using executable allows the system to easily alter the application without needing to recompile. You don't have to worry about syntax, or learn parameters, when you have finished creating your application, it has been validated and will run, eliminating the need for a compile process. Thus, a developer or administrator can alter the application on the fly and once he is complete, the new version of the application is immediately "deployed" to the users where it can be run, never having been compiled as such. Thus, the flexibility of an interpreted language is maintained, with the speed of a compiled language.

This language programming without true compilation is accomplished by utilizing functions that have previously been verified and are able to operate within the relevant operating system. The developer/administrator then creates the application using these previously verified functions, resulting in an application that itself does not need any verification or compilation. The sequence of the functions is then interpreted at runtime. This allows for the flexibility to move the functions around in the sequence however it is wished. This may be termed "minimally interpreted verified functions."

As stated earlier, the present disclosure provides a single integrated software project deployment platform that allows administrators to easily and effectively deploy software projects to remote computers. This allows business users with no Information Technology background or capabilities to develop and deploy sophisticated applications for execution on remote systems, such as mobile computers. Mobile workers can connect to backend enterprise systems in real-time to capture rich data types such as digital signatures, photos, speech recognition, bar code scans, etc. while in the field.

It should be noted that while the applicability of the present disclosure to mobile computing will be described throughout this document, the present disclosure should not be limited to the deployment of projects to mobile computers. Many of the elements of the present disclosure could apply more generally to any type of computers.

Figure 4:
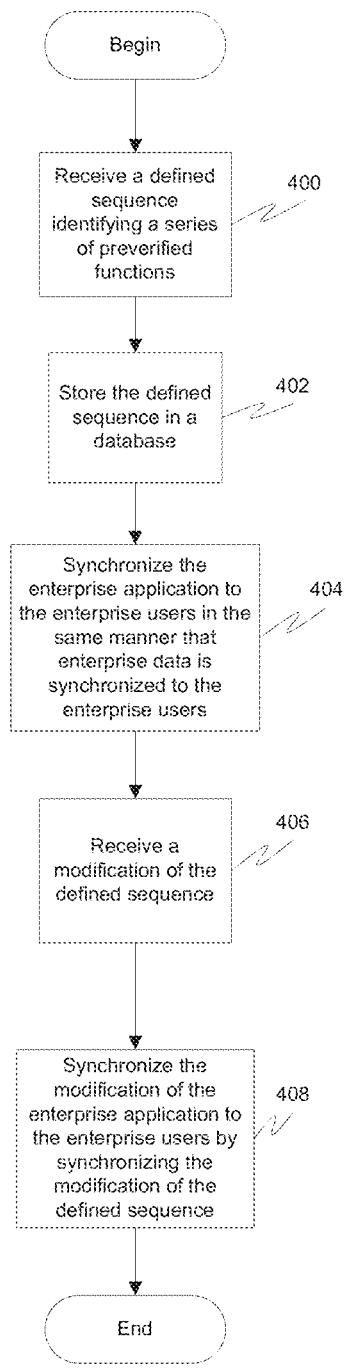
FIG. 4 is a flow diagram illustrating a method for deploying an enterprise application to enterprise users in accordance with an example embodiment.

FIG. 4 is a flow diagram illustrating a method for deploying an enterprise application to enterprise users in accordance with an example embodiment. At 400, a defined sequence identifying a series of preverified functions is received, wherein the defined sequence constitutes the enterprise application. The preverified functions may have been checked for proper syntax and otherwise ensured that they will run in an operating system run by the enterprise users. The enterprise application may contain a business workflow comprising a series of data gathering steps and actions based on those data gathering steps.

At 402, the defined sequence is stored in a database, wherein the database additionally includes enterprise data created by use of the enterprise application. At 404, the enterprise application is synchronized to the enterprise users in the same manner that the enterprise data is synchronized to the enterprise users. The synchronizing may include distributing the one or more preverified functions and the defined sequence to one or more thin client servers.

At 406, a modification of the defined sequence is received, resulting in a modification of the enterprise application. At 408, the modification of the enterprise application is synchronized to the enterprise users by synchronizing the modification of the defined sequence.

It should be noted that distribution of the enterprise may be performed in a manner that facilitates what the inventor has termed as "smart rendering." In smart rendering, the application takes into account the device on which it is to be executed when running the application. For example, if the application is to be run on a smartphone with a 4" screen, the application may be executed such that items displayed on the screen appear correctly for that small a screen. Likewise, when the application is to be executed on a tablet computer with a 9" screen, the application may be executed differently. Similarly, if the default language of the smartphone is English, then the application may be executed in English, whereas if the default language of the tablet is French the application may be executed in French. The ability to smart render can be built into the application itself at design time, and thus this ability may be synchronized to the recipient device when the rest of the application is synchronized.

Figure 5:
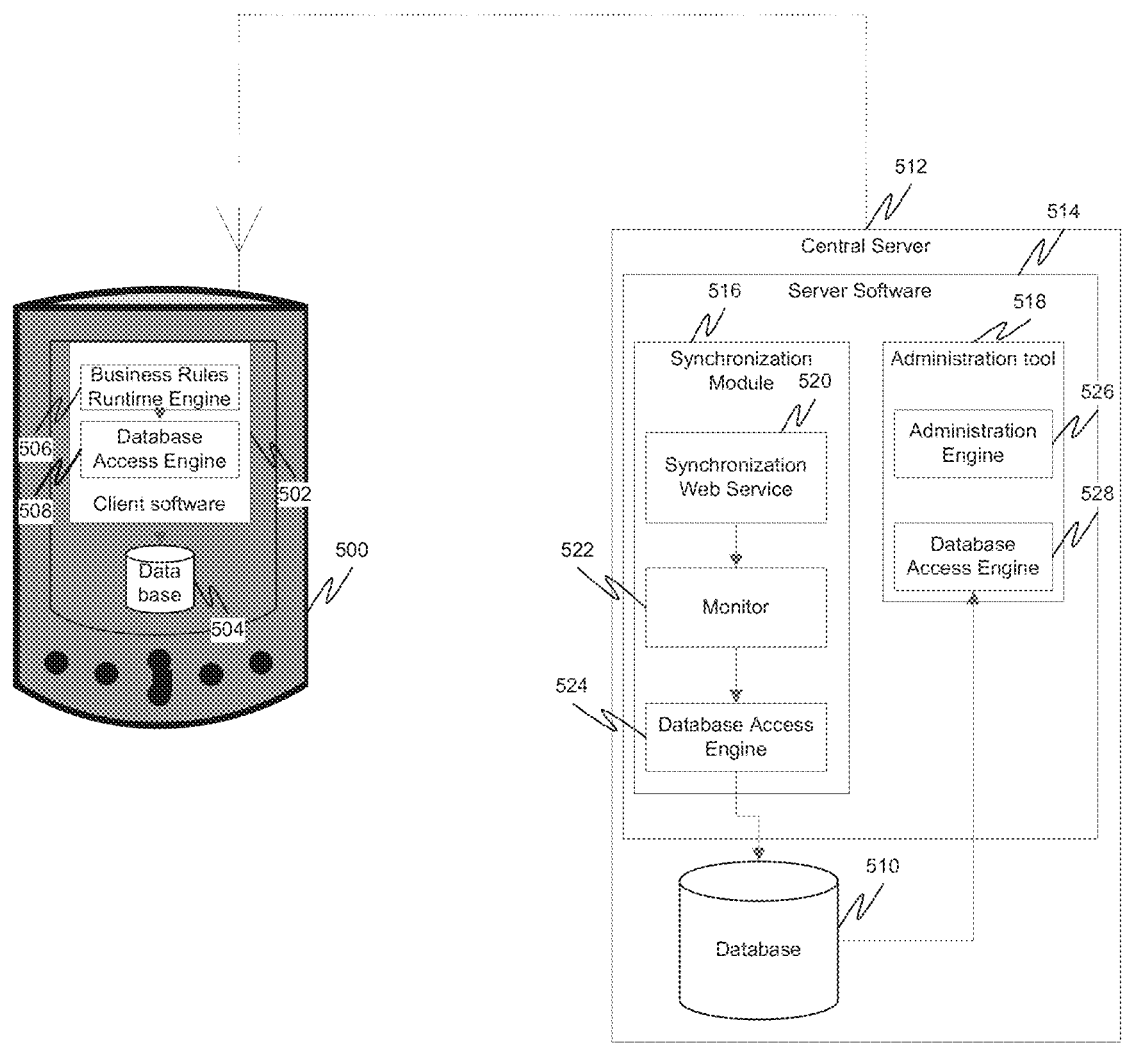
FIG. 5 is a block diagram illustrating an architecture for integrated deployment of software projects in accordance with an example embodiment.

FIG. 5 is a block diagram illustrating an architecture for integrated deployment of software projects in accordance with an example embodiment. A remote computer such as a mobile device 500 may contain client software 502 and a local database 504. The client software 502 may include a Business Rules Runtime Engine 406 and a database access engine 508. The Business Rules Runtime Engine 506 may interpret application logic received from a central server and render a user interface for the application logic based on the platform and language of the mobile device 500. The Business Rules Runtime Engine 406 may also receive and execute automatic updates to various plug-ins and system software on the client software 502, as well as automatically discover appropriate device drivers. The database access engine 508 may interface with the Business Rules Runtime Engine 506 to provide disconnected, connected, or hybrid data access to the local database 504 and/or central database 510.

A central server 512 may contain server software 514. The central server 512 may also contain a central database 510, however in many implementations it will be more desirable to locate the central database 510 outside of the central server 512. The server software 514 may include a synchronization module 516 and an administration tool 518. The synchronization module 516 may utilize a synchronization web service 520 to coordinate the synchronization of projects, applications, plug-ins, and system updates and perform communication hub messaging. A monitor 522 may monitor the system and automatically configure it to improve efficiency. Access to the central database 510 may be facilitated through a database access engine 524.

The administration tool 518 may include an administration engine 526 and a database access engine 528. The administration engine 526 may provide point and click authoring of applications and workflow, deployment management, enterprise data authoring, user administration, plug-in management, project management, results viewing and reporting, enterprise data management, Lightweight Directory Access Protocol (LDAP) Integration, and definition of an extensible workflow/device model. Access to the central database 510 may be facilitated through the database access engine 528.

The central database 510 may provide for support of local, external, compound, or other types of data objects. However, many types of database implementations are possible in accordance with the present disclosure, and thus this should not be read as limiting.

A business administrator may create a software project using the administration tool 518. Projects may include software applications (also known as tasks) as well as workflow. Each application may comprise a series of data gathering "steps". A step may contain information regarding the onscreen prompt for the data, the type of data expected (e.g., text, date/time, barcode, photograph) and the type of input mechanism to capture the data (e.g., textbox, calendar, barcode scanner, camera). Steps that capture rich data types requiring external devices need not prompt for device specific information such as hardware settings. Any device that supports the rich data type may be automatically discovered and used on the client using automatic device driver discovery. Steps may also contain options for defining valid lists of values, minimum, and maximum values, formatting of the onscreen data, translation of onscreen values to database values, and data present requirements. By default the order in which the steps are provided by the business administrator will be the order they are presented to the user. A step may also optionally contain workflow. Workflow will be described in more detail later, but it can be fired during step validation or after the value has been accepted into the step.

These steps may then be stored in the central database along with their attributes and then synchronized with the client software. On the client software side, the user interface could be automatically rendered or the administrator can design custom screens. Automatic rendering of a user interface will be described in more detail below.

Figure 6:
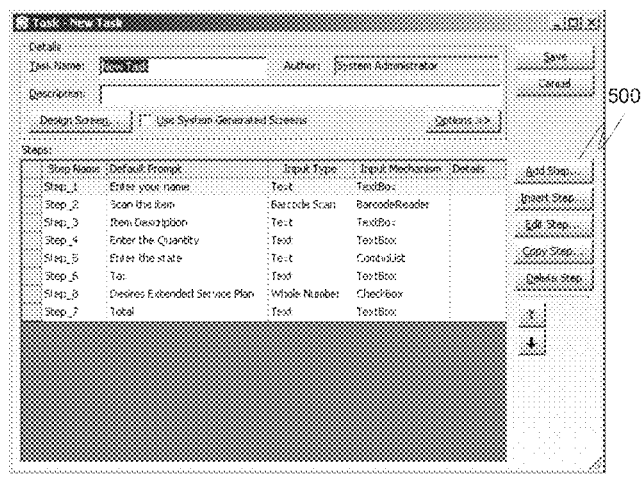
FIG. 6 is a diagram illustrating a screen capture of adding a step in accordance with an example embodiment.
Figure 7:
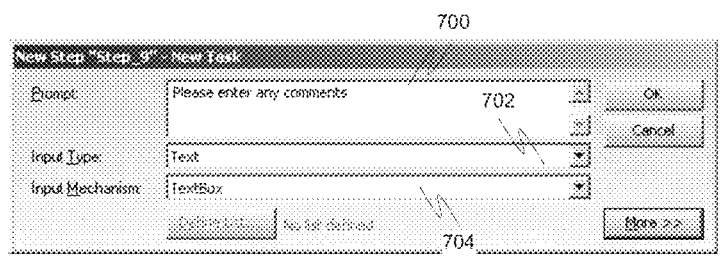
FIG. 7 is a diagram illustrating a screen capture of a step prompt in accordance with an example embodiment.
Figure 8:
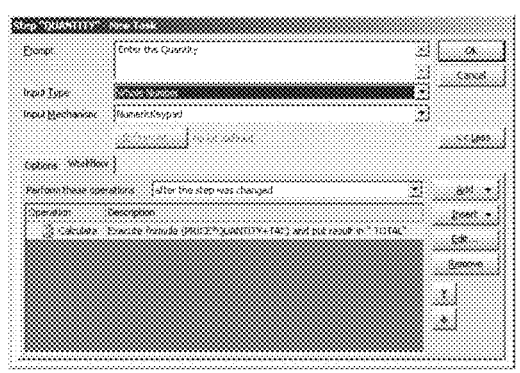
FIG. 8 is a diagram illustrating a screen capture of editing workflow in accordance with an example embodiment.
Figure 9:
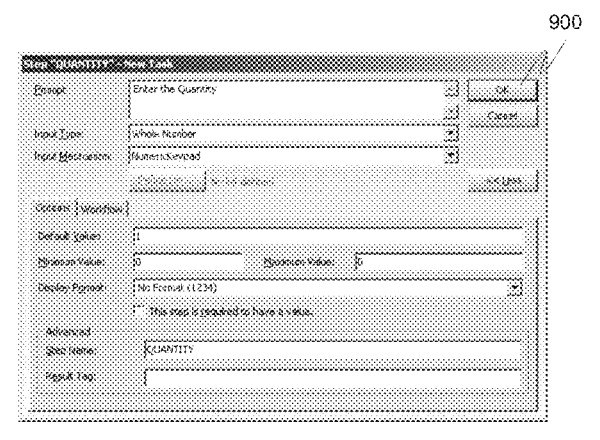

Authoring of the application may be performed by the business administrator using a point and click interface. This is depicted in FIGS. 6-9. FIG. 6 is a diagram illustrating a screen capture of adding a step in accordance with an example embodiment. First, the business administrator may click an add step button 600 using a mouse or by pressing enter while the add step button 600 has focus. FIG. 7 is a diagram illustrating a screen capture of a step prompt in accordance with an example embodiment. The business administrator is presented with a means to enter a prompt for the step 700, enter the data type expected 702, and enter an input mechanism 704 for the data. The business administrator may then optionally edit workflow for the step or set various step options including the steps name, default value, range of numeric values or string lengths allowed, lists, and format, as depicted in FIG. 8. FIG. 8 is a diagram illustrating a screen capture of editing workflow in accordance with an example embodiment. The business administrator may also define various options, such as valid lists of values, minimum, and maximum values, formatting of the onscreen data, translation of onscreen values to database values, and data present requirements, as depicted in FIG. 9. FIG. 9 is a diagram illustrating a screen capture of adding options in accordance with an example embodiment. The business administrator may then complete the addition of the step to the application by pressing OK 900. The screen may then return to that as depicted by FIG. 6, and focus may then be put back on the add step button 600 so that steps can continue to bed added quickly without using a mouse.

Workflow may also be authored using a point and click interface. Each step can contain an unlimited series of workflow elements that will fire when the step is validating the input from the user or after the step has accepted the value. Each workflow element may be configured via an onscreen wizard without coding or compiling. The workflow may be authored on an individual step or on the application, and can also be authored for server side functionality. Workflow may also be rearranged using the point and click interface and new workflow can be inserted or added.

In accordance with an example embodiment, an extensible workflow model may be provided. The workflow function may be built upon a defined standardized interface. Implementing a class with this interface will make it available as a workflow. A workflow function or series of workflow functions can be compiled into a single workflow file (e.g., *.dll). Upon startup, the user device may look for these *.dll files and instantiate an instance of the function class. If a task uses the workflow in one of the *.dll's, the instantiated object may be called to perform the function. Any workflow function files loaded as plugins to the system may be automatically distributed to the mobile clients and available locally for authoring. Workflow functions can be optionally licensed, preventing use without payment for the function(s).

In accordance with an example embodiment, automatic device driver discovery may be provided. For steps that capture rich data types from external devices such as barcode scanners, magnetic stripe readers, and cameras, the system may automatically attempt to find the appropriate driver for the platform and device. A device driver may be built upon a standardized interface. Implementing a class with this interface will make it available as a device for input (or output). A device driver or series of drivers can be compiled into a single driver file (e.g., *.dll). Any device drivers loaded as plugins to the system may be automatically distributed to the mobile clients and available locally. Device drivers can be optionally licensed preventing use without payment for the drivers. Device drivers can be created to support any type of device imaginable, including barcode scanners, magnetic stripe readers, cameras, file attachments, sketches, digital signatures, biometric capture devices, RFID devices, and printers.

After deployment of the project to the mobile computer, the client software may run the application using the Business Rules Runtime Engine. This Engine may be available for all platforms and ensure consistency between the runtime environments. Applications can then run and collect data within the local database to provide for disconnected access to the application (by default). Applications can also optionally request data to a connected live server (connected or hybrid). As input into steps is received, a workflow may fire and be run. Any workflow that requires an immediate connection back to the central server data may have the request brokered to the database engine for processing. If a step contains a rich data type, the appropriate device driver for the platform and device is selected if available.

The Synchronization Module may pass data objects with encoded structured methods, logic, and workflow to be interpreted, displayed, and enforced on the mobile computing device. The mobile computing device then interprets the data object's actionable state, displays a user interface, manages business data, method, logic, and workflow and creates results (in the form of results objects). These results objects may contain an abstraction of the data captured on the mobile device in response to requests by the data object's embedded business processes. The results objects mat then be transferred back to the server and used for display, reporting, and driving diverse enterprise applications.

Applications that are run can be put on hold for completion later, and multiple applications may run simultaneously, subject to the processing power and memory availability of the mobile computer. Furthermore, application definitions may be cached for efficiency in rerunning the same application. The screen layout to use for the application may be determined using intelligent rendering, which will be described in more detail later. If there is a matching screen layout for the platform and language, it may be used. If there is a matching screen layout for the platform, but not the language, a default (e.g., English) may be used. If there is neither a machine layout for the platform or the language, one will be automatically generated in English for the current platform using intelligent rendering.

Each step captured may be time stamped with the collection date for the step, for later use. Each application instance may receive a unique identification to ensure its uniqueness system-wide. Any completed applications may have their results stored in the local database. Completed applications may then synchronize with the server to provide the results.

Enterprise data may be object-oriented. It can exist locally, externally, or virtually. Any object instance can be related to any other object instance. Enterprise data may be used in projects to define a subset of the information available to an application running on the mobile device. The central enterprise data may then optionally be queried remotely from the application in the field.

Projects comprise one or more tasks, the users they should be deployed to, and/or any enterprise data used by the tasks. Projects may also comprise scheduling options that determine when to deploy or rescind the project and its applications and data. These events occur whether the administration tool is running or not. Results of the applications that have been synchronized with the server can then be viewed by the business administrator per project or per task, using the administration tool. The results may also be exported into third party applications such as spreadsheet programs or word processors. Statistics regarding the deployment may also be available, on a per user, per application, or per project basis.

In an example embodiment, changes to a project may be automatically synchronized to the client software to allow for on-the-fly deployments of changes to applications or workflows. The updates may be integrated into projects immediately upon synchronization, regardless of whether the project is currently running or not. This creates a bi-directional data flow between the business administrators and the mobile workers that exists for the life of the project. Additionally, smart synchronization features may be provided that intelligently synchronize the information and monitor the features and attributes.

Smart synchronization may synchronize or remove projects based on deployment configuration. It may send all data associated or needed by a project automatically, and remember what data was sent to avoid redundancy and decrease synchronization times. Data sent for expired projects may be automatically cleaned up on the mobile device. Any plug-ins (e.g., workflow functions or new device drivers) may be automatically distributed to the correct device. Additionally, any system or software updates (such as new features or bug fixes) may also be automatically distributed to the correct device and set up for automatic installation. This also includes database updates. In an example embodiment, while the database schema is identical between the database and the client, only project and enterprise data relating to the current mobile worker's currently active projects is downloaded to the mobile device during synchronization.

In an example embodiment, a proprietary binary format may be used in communication payloads which yields better efficiency, security, and footprint. This proprietary format may include only bytes of serialized objects along with object types. By storing these serialized objects in binary form, the overhead of XML or other languages can be avoided and the total number of bytes in the entire transmission is much smaller.

Smart Synchronization may automatically occur whenever an IP address is present (e.g., devices is cradled, on an 802.11 network, on a GPRS network, or connected via a network card or modem). This allows mobile devices to be updated in a manner that ensures as best as possible that projects on the mobile devices are the latest versions of the projects. Intelligent caching of data on the server may be performed to maximize scalability and throughput. Smart synchronization may also act as a scheduler for projects set up by an administration tool. Smart synchronization may also log its synchronization activities and provide multiple levels of log detail for administrators to view.

Additionally, Smart Synchronization may act as a liaison for remote access to the central database by mobile devices requesting access to live data. It may also act as a communications hub for any messaging between the mobile devices and/or the central administrators.

In an example embodiment, smart synchronization may include continuous delta synchronization. Here, the changes to enterprise data, system files, projects, tasks, metadata, etc, are proliferated to the client devices during synchronization. This provides for on-the-fly changes to be made and realized in the field. When a project expires or is canceled, the project and all of its related data may be automatically removed from the clients during the next synchronization. If desired, the synchronization records for a device or user can be reset, causing a full re-send of all data appropriate for that user and device.

Figure 10:
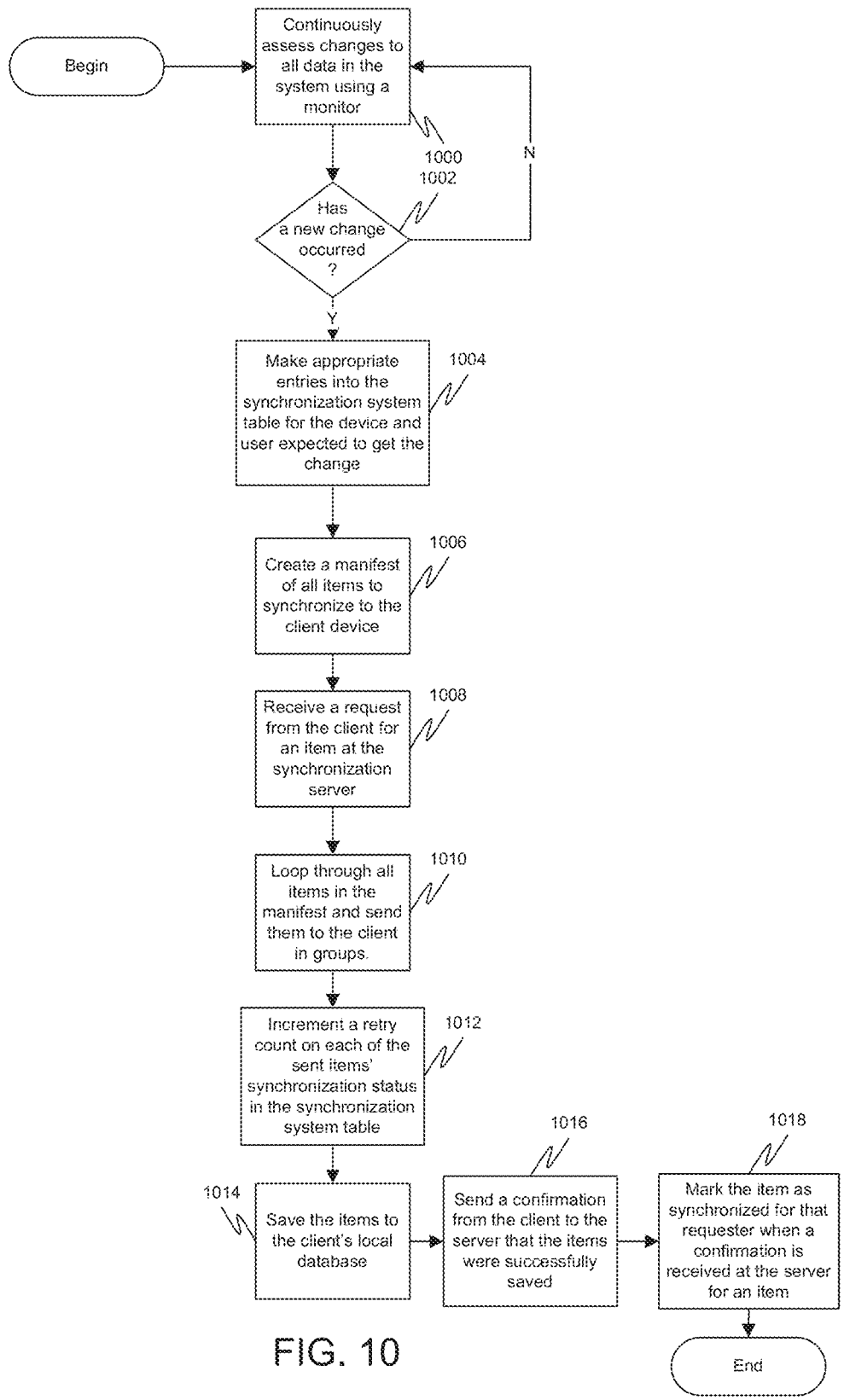
FIG. 10 is a flow diagram illustrating continuous delta synchronization in accordance with an example embodiment.

FIG. 10 is a flow diagram illustrating continuous delta synchronization in accordance with an example embodiment. A system table may contain all items that need to be synchronized for a particular device and user. Additionally, objects, including administrator-defined or system objects, may have system fields that designate the last time that object was changed and who changed it. It should be noted that deletion of an item may also be considered a change. At 1000, the monitor may continually assess changes to all data in the system. This data may include enterprise data as well as functions within the enterprise applications themselves. At 1002, it may be determined if a new change is discovered. If so, then at 1004, the monitor may make appropriate entries into the synchronization system table for the device and user expected to get those changes. At 1006, the synchronization server may create a manifest of all items to synchronize to the client device. This may be created based on information in the synchronization system table. It may be created upon receipt of a synchronization request from the mobile computing device, which may be generated upon the detection a network address for the mobile computing device by the synchronization server. In order for an item to be included in the manifest, it should pass the following tests:

1. The user should be a current valid user
2. The device should be a current valid device
3. The item should be designated to go to the requestor
4. The item should be designated as not yet received by the requestor
5. The item should have a retry count below a set number if not received by the requestor. This set number is configurable.

At 1008, the client may request an item from the synchronization server. At 1010, the synchronization server may loop through all the items in the manifest and send them to the client in groups. The size of the group is configurable. At 1012, the server may increment a retry count on each of the sent items' synchronization status in the synchronization system table.

At 1014, the client may then save the items to the local database. At 1016, the client may send a confirmation back to the server that the items were successfully saved. If the client sees that it already has the most recent version of an item, it may simply confirm the item without requesting it. At 1018, when the server receives a confirmation request, it may mark the item as synchronized for that requestor in the synchronization system table. If an error occurs on the client during processing, the error information may be sent to the synchronization server for logging on the server. The log may include the user, device, and timestamp information. Server side synchronization errors may also be logged.

Figure 11:
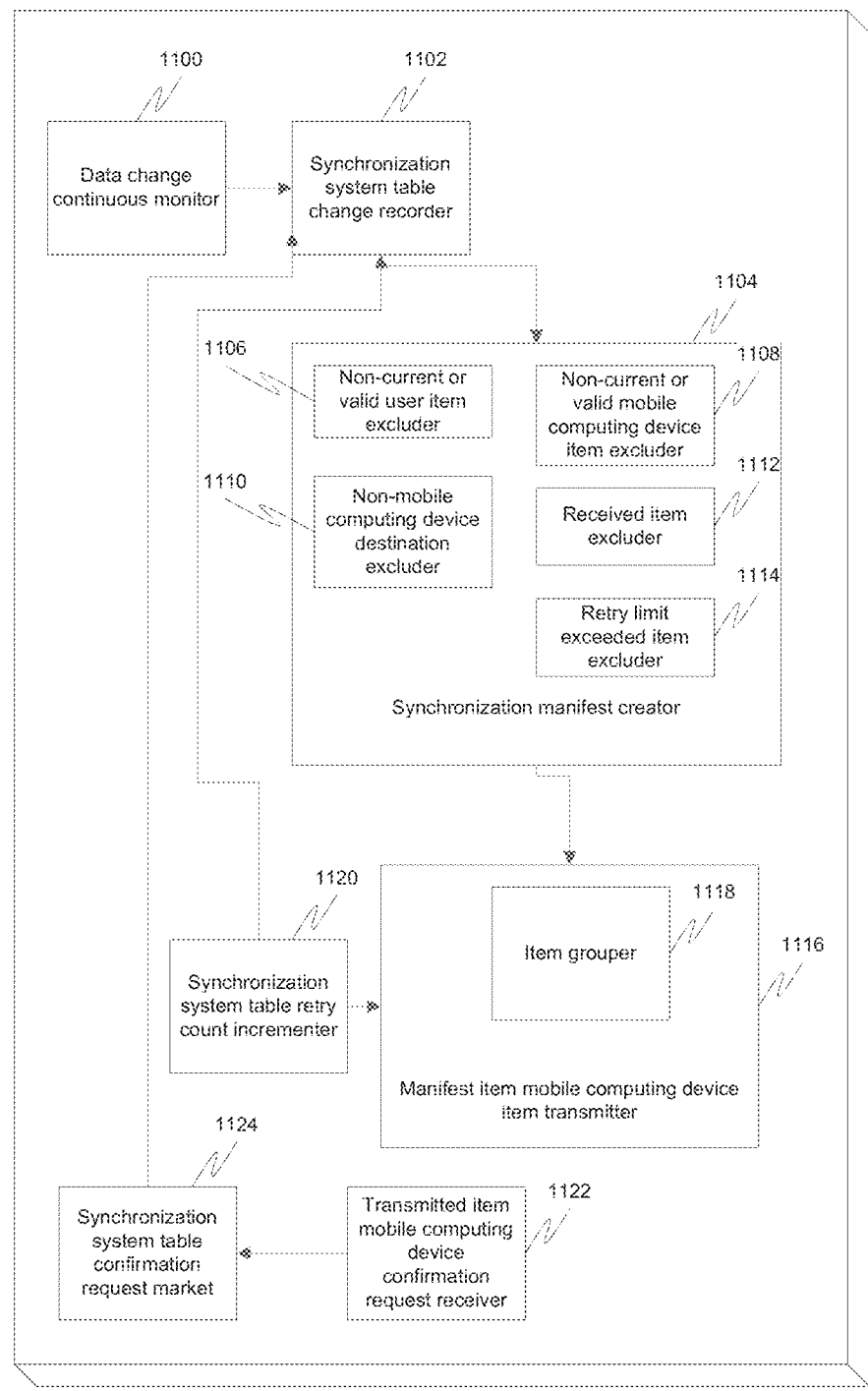
FIG. 11 is a block diagram illustrating an apparatus for intelligently synchronizing a central server with a mobile computing device in accordance with an example embodiment.

FIG. 11 is a block diagram illustrating an apparatus for intelligently synchronizing a central server with a mobile computing device in accordance with an example embodiment. A data change continuous monitor 1100 may continuously monitor changes to data in the central server. A synchronization system table change recorder 1102 coupled to the data change continuous monitor 1100 may, upon discovery of a change relevant to the mobile computing device, note the change in a synchronization system table corresponding to the mobile computing device, the synchronization system table containing all items that need to be synchronized for the mobile computing device. A synchronization manifest creator 1104 coupled to the synchronization system table change recorder 1102 may create a manifest of all items to synchronize with the mobile computing device, the creating based upon information in the synchronization system table. The synchronization manifest creator 1104 may include a series of components designed to ensure that only the proper items be added to the manifest. This includes a non-current or valid user item excluder 1106 which excludes an item from the manifest if the item corresponds to a user who is not a current valid user. A non-current or valid mobile computing device item excluder 1108 may exclude an item from the manifest if the item corresponds to a mobile computing device that is not a current valid mobile computing device. A non-mobile computing device destination item excluder 1110 may exclude an item from the manifest if the item is not designated to go to the mobile computing device. A received item excluder 1112 may exclude an item from the manifest if the item has been designated as received by the mobile computing device.

Finally, a retry limit exceeded item excluder 1114 may exclude an item from the manifest if the item has an associated retry count equal to or greater than a preconfigured retry limit.

A manifest item mobile computing device item transmitter 1116 coupled to the synchronization manifest creator 1104 may transmit the items in the manifest to the mobile computing device. This may including transmitting the items in groups by continuously looping through the manifest using an item grouper 1118. A synchronization system table retry count incrementer 1120 coupled to the manifest item mobile computing device item transmitter 1116 and to the synchronization system table change recorder 1102 may increment a retry count in the synchronization system table for each transmitted item. A transmitted item mobile computing device confirmation request receiver 1122 may receive a confirmation request from the mobile computing device for one or more transmitted items. Finally, a synchronization system table confirmation request marker 1124 coupled to the transmitted item mobile computing device confirmation request receiver 1122 and to the synchronization system table change recorder 1102 may mark each of the one or more transmitted items for which a confirmation request has been received as synchronized in the synchronization system table.

Figure 12:
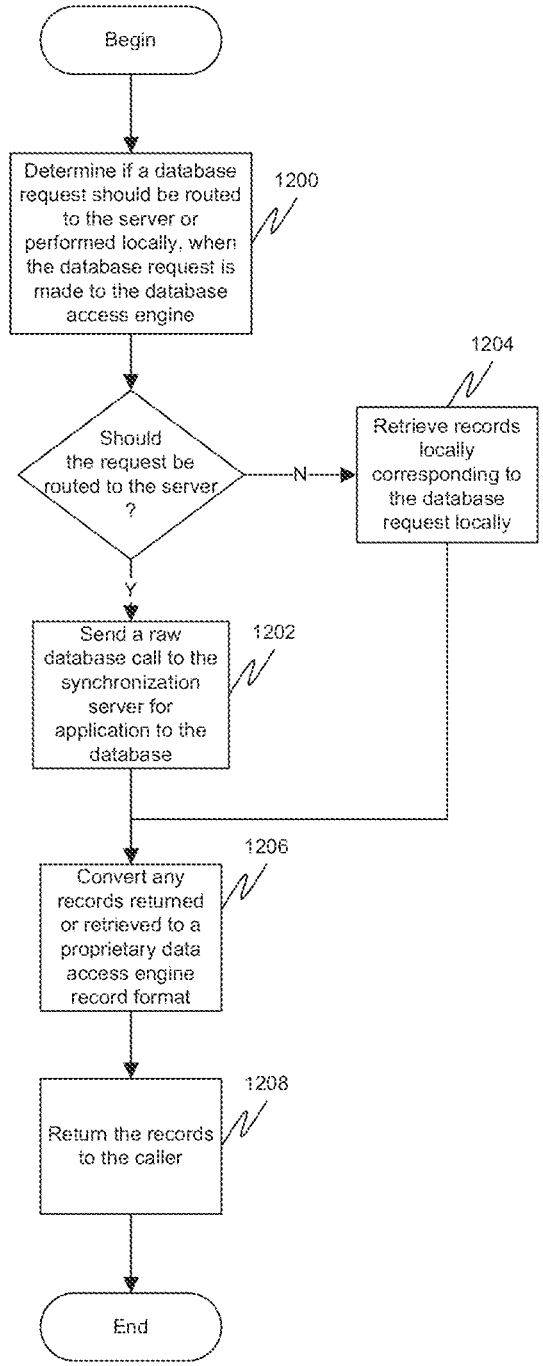
FIG. 12 is a flow diagram illustrating handling a remote access request in accordance with an example embodiment.

The synchronization server supports the ability to proxy database requests to its database. Requests for remote access may be made via known web service calls by the database access engine. FIG. 12 is a flow diagram illustrating handling a remote access request in accordance with an example embodiment. At 1200, when a database request is made to the database access engine, the database access engine determines if the request should be routed to the server or performed locally. If it is to be routed to the server, then at 1202 a raw database call (such as a SQL call) may be sent to the synchronization server for application to the database. If not, then at 1204, records corresponding to the database request may be retrieved locally. At 1206, any records returned or retrieved may be converted to a proprietary database access engine record format. At 1208, the database access engine may return the records to the caller. Any returned records may be converted to an internal proprietary record format similar to that utilized for communications as described above. Namely, the records may be serialized and stored in binary form for transmission as opposed to using a web language such as XML, which adds overhead.

The synchronization server supports the ability to receive or send communication requests to other users or administrators of the server. Requests for pending messages and requests to send messages may be made via known web service calls. Messages may be stored in a proprietary format that supports the ability to send partially complete tasks to other users, messages, attachments, etc. This proprietary format may be similar to that utilized for communications as described above. Namely, the communications may be serialized and stored in binary form for transmission as opposed to using a web language such as XML, which adds overhead.

Figure 13:
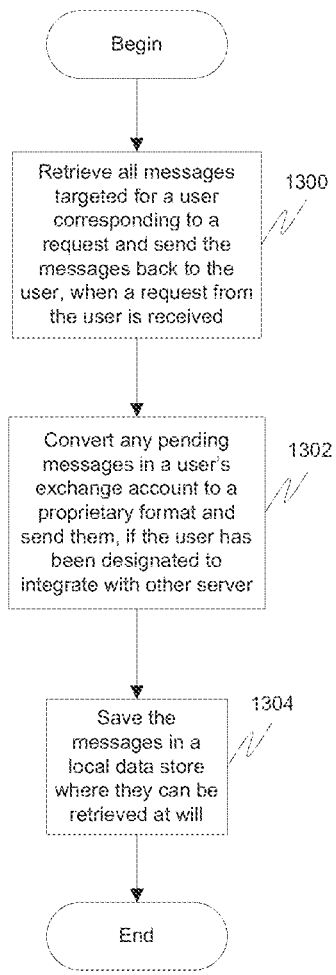
FIG. 13 is a flow diagram illustrating handling a request for pending messages in accordance with an example embodiment.

Messages may be stored in a system table. FIG. 13 is a flow diagram illustrating handling a request for pending messages in accordance with an example embodiment. At 1300, when a request is received, all messages targeted for that user may be retrieved from the database and sent back. At 1302, if the user has been designated to integrate with another servers, such as a Microsoft Exchange server, any pending messages in their exchange account may be converted to the proprietary format and sent. At 1304, the messages may then be saved in a local data store where they can be retrieved at will.

Figure 14:
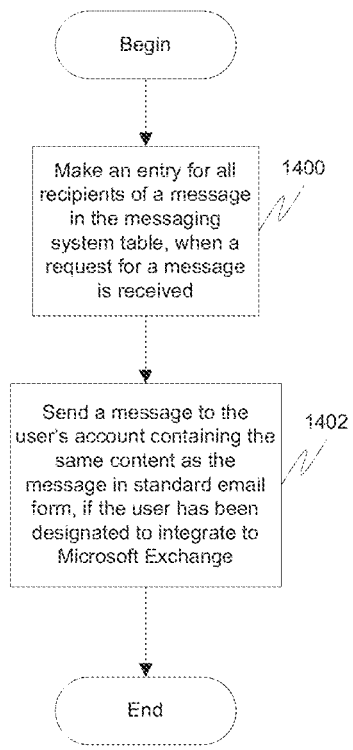
FIG. 14 is a flow diagram illustrating handling a request to send a message in accordance with an example embodiment.

FIG. 14 is a flow diagram illustrating handling a request to send a message in accordance with an example embodiment. At 1400, when the request is received, all recipients may have an entry made for the message in the messaging system table. At 1402, if the user has been designate to integrate to Microsoft Exchange, their user account may have a message sent to it from the server containing the same content as the message in standard email form. An administration tool may be provided to allow for authoring and central management of applications. Through it, projects and deployments may be created, configured, and managed. Additionally, statistics can be viewed regarding deployments. Reports of results coming in from deployed applications may also be viewed. The administration tool may also provide for the management of plug-ins and system updates, as well as the creation, configuration, exploration, import/export, and management of enterprise data, and user administration, including security and LDAP integration, as well as license administration.

Figure 15:
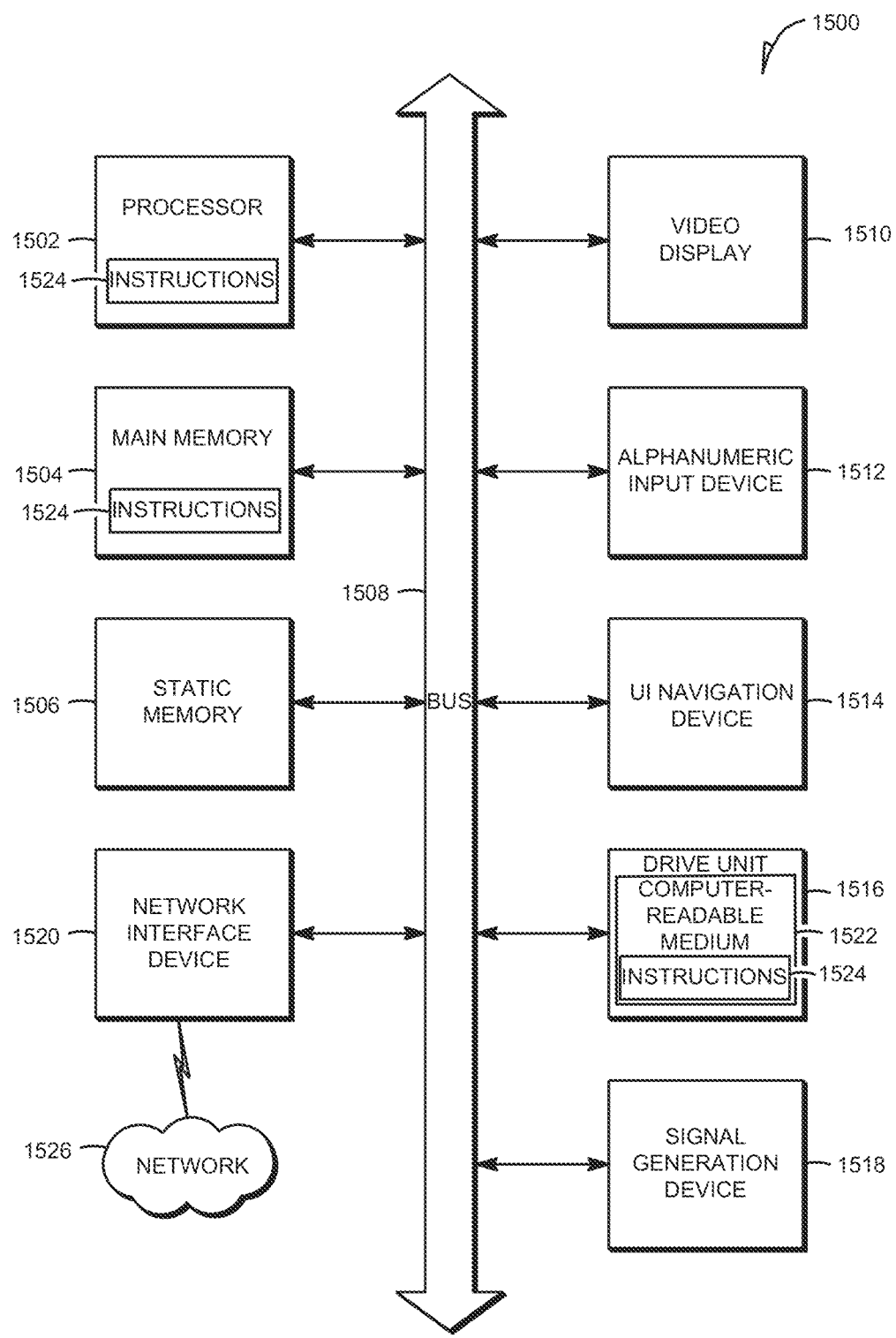
FIG. 15 shows a diagrammatic representation of a machine in the example form of a computer system within which a set of instructions may be executed to cause the machine to perform any one or more of the methodologies discussed herein.

FIG. 15 shows a diagrammatic representation of a machine in the example form of a computer system 1500 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a UI navigation device 1514 (e.g., a mouse), a disk drive unit 1516, a signal generation device 1518 (e.g., a speaker) and a network interface device 1520.

The disk drive unit 1516 includes a machine-readable medium 1522 on which is stored one or more sets of instructions and data structures (e.g., software 1524) embodying or utilized by any one or more of the methodologies or functions described herein. The software 1524 may also reside, completely or at least partially, within the main memory 1504 and/or within the processor 1502 during execution thereof by the computer system 1500, with the main memory 1504 and the processor 1502 also constituting machine-readable media.

The software 1524 may further be transmitted or received over a network 1526 via the network interface device 1520 utilizing any one of a number of well-known transfer protocols (e.g., HTTP).

While the machine-readable medium 1522 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding or carrying a set of instructions for execution by the machine and that cause the machine to perform any one or more of the methodologies of the present description or that is capable of storing, encoding or carrying data structures utilized by or associated with such a set of instructions. The term "machine-readable medium" shall accordingly be taken to include, but not be limited to, solid-state memories, optical media, and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

Although only a few embodiments of the disclosure have been described in detail, it should be appreciated that the disclosure may be implemented in many other forms without departing from the spirit or scope of the disclosure. Therefore, the present embodiments should be considered illustrative and not restrictive and the disclosure is not to be limited to the details given herein, but may be modified within the scope and equivalents of the appended claims.

What is claimed is:

1. A method for deploying an enterprise application to enterprise users, the method comprising:
   receiving a defined sequence identifying a series of preverified functions, wherein the defined sequence constitutes the enterprise application;
   storing the defined sequence in a database as enterprise data and not as an executable file, wherein the database additionally includes enterprise data created by use of the enterprise application; and
   synchronizing the enterprise application to the enterprise users as enterprise data, in the same manner that the enterprise data is synchronized to the enterprise users.

2. The method of claim 1, wherein the preverified functions have been checked for proper syntax and otherwise ensured that they will run in an operating system run by the enterprise users.

3. The method of claim 1, wherein the synchronizing includes distributing the one or more preverified functions and the defined sequence to one or more thin client servers.

4. The method of claim 1, wherein no compilation of the predefined functions takes place after the defined sequence has been received.

5. The method of claim 1, further comprising:
   receiving a modification of the defined sequence, resulting in a modification of the enterprise application; and
   synchronizing the modification of the enterprise application to the enterprise users by synchronizing the modification of the defined sequence.

6. The method of claim 1, wherein the enterprise application contains a business workflow comprising a series of data gathering steps and actions based on those data gathering steps.

7. A central server comprising:
   a processor;
   a database containing enterprise application data as well as at least one enterprise application, wherein the at least one enterprise application includes a plurality of verified functions and a sequence, the at least one enterprise application being stored as enterprise data and not as an executable file;
   a synchronization module configured to monitor the database for changes to either the enterprise data or the at least one enterprise application and to synchronize such changes, as enterprise data, with one or more client devices.

8. The central server of claim 7, wherein the one or more client devices include at least one smart thin client server.

9. The central server of claim 7, wherein the synchronization module includes a synchronization web service, a monitor, and a database access engine, wherein the synchronization web server keeps tracks of which client devices are to receive which enterprise data and enterprise applications.

10. The central server of claim 7, wherein the synchronization of changes to the enterprise application includes sending an updated sequence to the one or more client devices without sending updated functions.

11. The central server of claim 7, further comprising an administration tool having an administration engine and a database access engine, wherein the administration tool is configured to allow a developer or administrator to modify an application by modifying the sequence of the functions.

12. An apparatus for deploying an enterprise application to enterprise users, the apparatus comprising:
   means for receiving a defined sequence identifying a series of preverified functions, wherein the defined sequence constitutes the enterprise application;
   means for storing the defined sequence in a database as enterprise data and not as an executable file, wherein the database additionally includes enterprise data created by use of the enterprise application; and
   means for synchronizing the enterprise application to the enterprise users as enterprise data, in the same manner that the enterprise data is synchronized to the enterprise users.

13. The apparatus of claim 12, wherein the preverified functions have been checked for proper syntax and otherwise ensured that they will run in an operating system run by the enterprise users.

14. The apparatus of claim 12, wherein the means for synchronizing includes means for distributing the one or more preverified functions and the defined sequence to one or more thin client servers.

15. The apparatus of claim 12, wherein no compilation of the predefined functions takes place after the defined sequence has been received.

16. The apparatus of claim 12, further comprising:
   means for receiving a modification of the defined sequence, resulting in a modification of the enterprise application; and
   means for synchronizing the modification of the enterprise application to the enterprise users by synchronizing the modification of the defined sequence.

17. The apparatus of claim 12, wherein the enterprise application contains a business workflow comprising a series of data gathering steps and actions based on those data gathering steps.

18. A non-transitory computer-readable storage medium storing a set of instructions that, when executed by a processor, cause the processor to perform operations, comprising:
- receiving a defined sequence identifying a series of pre-verified functions, wherein the defined sequence constitutes an enterprise application;
- storing the defined sequence in a database as enterprise data and not as an executable file, wherein the database additionally includes enterprise data created by use of the enterprise application; and
- synchronizing the enterprise application to the enterprise users as enterprise data, in the same manner that the enterprise data is synchronized to the enterprise users.

\* \* \* \* \*